US007479973B2

(12) United States Patent
Brewer et al.

(10) Patent No.: US 7,479,973 B2
(45) Date of Patent: Jan. 20, 2009

(54) METHOD AND APPARATUS FOR PRODUCING AN IMAGE

(75) Inventors: James Arthur Brewer, Leander, TX (US); Kevin Enders, Round Rock, TX (US); Stanley Osgood, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 444 days.

(21) Appl. No.: 11/317,347

(22) Filed: Dec. 23, 2005

(65) Prior Publication Data

US 2007/0146465 A1 Jun. 28, 2007

(51) Int. Cl.

| | |
|---|---|
| ***B41J 2/385*** | (2006.01) |
| ***B41J 2/435*** | (2006.01) |
| ***G03G 15/04*** | (2006.01) |
| ***G03G 15/22*** | (2006.01) |
| ***G02B 27/64*** | (2006.01) |

(52) U.S. Cl. ....................... 347/130; 347/224; 399/221; 399/151; 359/555

(58) Field of Classification Search ................. 347/130, 347/224; 399/221, 151; 359/555
See application file for complete search history.

(56) References Cited

U.S. PATENT DOCUMENTS

| | | | | |
|---|---|---|---|---|
| 4,234,250 | A | 11/1980 | Mailloux et al. | |
| 4,428,647 | A | 1/1984 | Sprague et al. | |
| 4,691,212 | A * | 9/1987 | Solcz et al. | 347/257 |
| 5,285,217 | A | 2/1994 | Avonts | |
| 5,324,608 | A | 6/1994 | Gerriets et al. | |
| 5,402,436 | A | 3/1995 | Paoli | |
| 5,663,814 | A | 9/1997 | Hada et al. | |
| 5,808,656 | A | 9/1998 | Goldmann | |
| 6,057,867 | A * | 5/2000 | Chan et al. | 347/134 |
| 6,246,847 | B1 | 6/2001 | Jeong et al. | |
| 6,307,584 | B1 | 10/2001 | Hirst et al. | |
| 2002/0121593 | A1 | 9/2002 | Sakamoto | |

FOREIGN PATENT DOCUMENTS

| | | |
|---|---|---|
| WO | WO 03/040802 A2 | 5/2003 |
| WO | WO 03/040802 A3 | 5/2003 |
| WO | WO 03/040803 A2 | 5/2003 |
| WO | WO 03/040803 A3 | 5/2003 |

* cited by examiner

*Primary Examiner*—Stephen D Meier
*Assistant Examiner*—Sarah Al-Hashimi
(74) *Attorney, Agent, or Firm*—Haynes and Boone, LLP

(57) ABSTRACT

An image producing apparatus includes a photoconductor. A photonic energy device is positioned adjacent the photoconductor. A reflecting member is located adjacent the photonic energy device, whereby at least a portion of the reflecting member is operable to deform upon application of an electrical voltage in order to direct photonic energy from the photonic energy device towards the photoconductor with the reflecting member. The reflecting member may direct the photonic energy from the photonic energy device towards the surface of the photoconductor in order to discharge portions of the surface of the photoconductor to produce an image.

20 Claims, 12 Drawing Sheets

Fig. 14
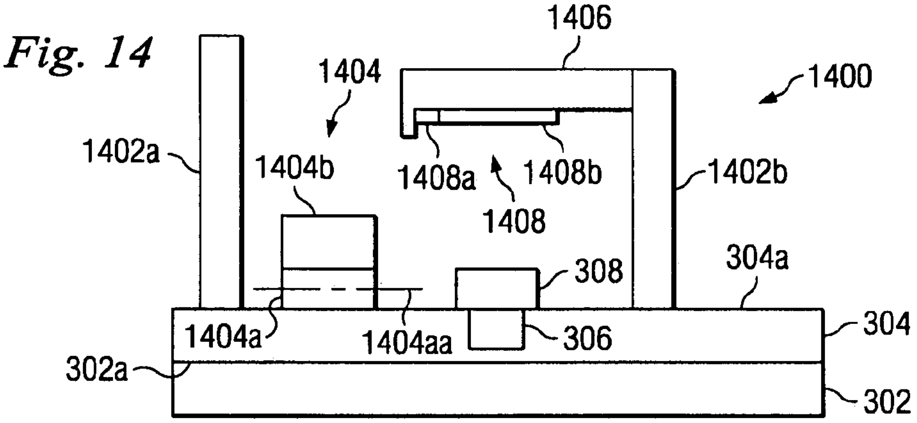
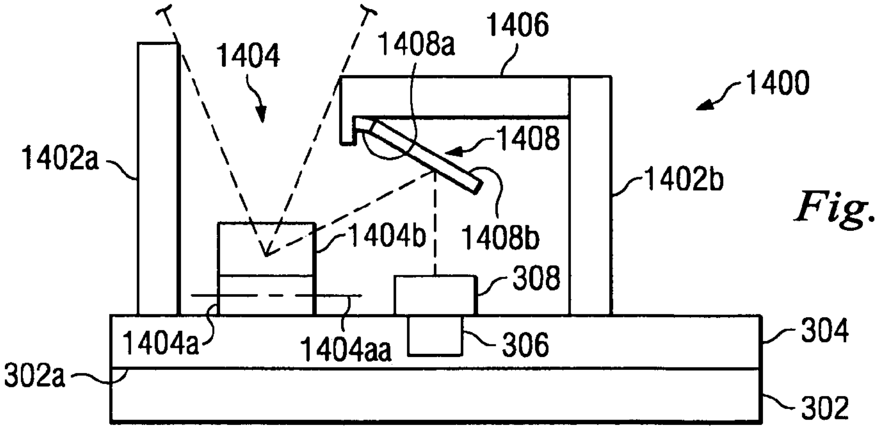
Fig. 15

METHOD AND APPARATUS FOR PRODUCING AN IMAGE

BACKGROUND

The present disclosure relates generally to information handling systems, and more particularly to producing an image with a printing device which is coupled to the information handling system.

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems typically include a printing device coupled to the information handling system for producing images. Printing devices such as, for example, laser printers, exhibit a noticeable failure rate due to a large number of moving and wearing mechanical parts. For example, conventional laser printers may use a laser beam directed at a high speed rotating polygon mirror which reflects the laser beam towards a photoconductor to remove charge from the photoconductor as part of producing an image. The beam from the laser strikes one of the mirror surfaces on the polygon mirror and is reflected across a range of angles as the polygon mirror rotates in front of the beam. When the mirror facet turns out of the beam path of the laser, a new mirror facet is rotated into the laser beam path, and that mirror facet moves across the beam path to repeat the sweep of beam angles that were made by the previous facet. This rotating polygon mirror is a mechanical part which is prone to failures, while the drive motor and circuitry for the polygon mirror create undesirable heat. To mitigate this and other reliability issues the industry uses preventive maintenance, where either a technician or the customer must replace certain wearing parts on a predetermined basis.

Furthermore, due to the fact that cost increases as the speed of the paper path increases in the laser printer, low cost laser printers tend to be slow.

Accordingly, it would be desirable to provide for producing an image absent the disadvantages found in the prior methods discussed above.

SUMMARY

According to one embodiment, an image producing apparatus includes a photoconductor, a photonic energy device positioned adjacent the photoconductor, and a reflecting member located adjacent the photonic energy device, whereby at least a portion of the reflecting member is operable to deform upon application of an electrical voltage in order to direct photonic energy from the photonic energy device towards the photoconductor with the reflecting member.

BRIEF DESCRIPTION OF THE DRAWINGS

FIGS. 14 and 15 are side views illustrating an embodiment of an image producing apparatus.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

Figure 1:
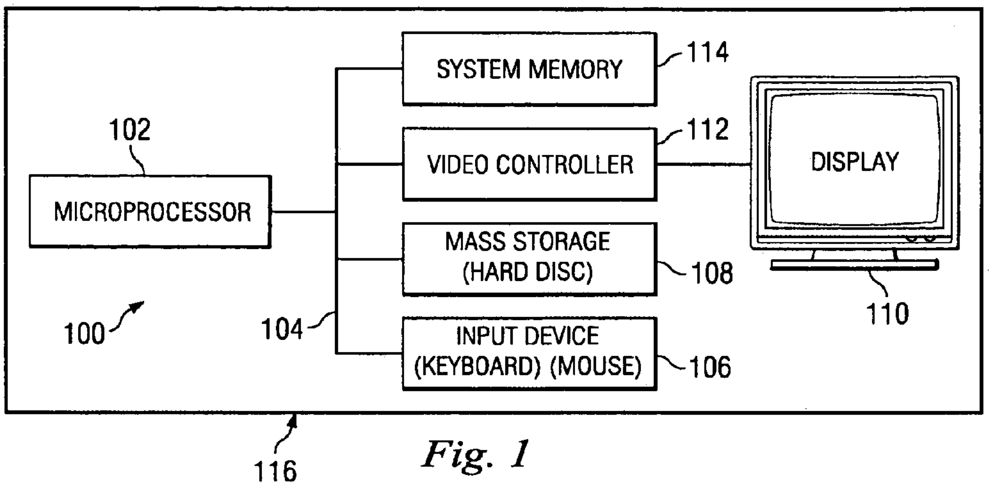
FIG. 1 is a schematic view illustrating an embodiment of an information handling system.

In one embodiment, information handling system 100, FIG. 1, includes a microprocessor 102, which is connected to a bus 104. Bus 104 serves as a connection between microprocessor 102 and other components of computer system 100. An input device 106 is coupled to microprocessor 102 to provide input to microprocessor 102. Examples of input devices include keyboards, touchscreens, and pointing devices such as mouses, trackballs and trackpads. Programs and data are stored on a mass storage device 108, which is coupled to microprocessor 102. Mass storage devices include such devices as hard disks, optical disks, magneto-optical drives, floppy drives and the like. Information handling system 100 further includes a display 110, which is coupled to microprocessor 102 by a video controller 112. A system memory 114 is coupled to microprocessor 102 to provide the microprocessor with fast storage to facilitate execution of computer programs by microprocessor 102. In an embodiment, a chassis 116 houses some or all of the components of information handling system 100. It should be understood that other buses and intermediate circuits can be deployed between the components described above and microprocessor 102 to facilitate interconnection between the components and the microprocessor.

Figure 2:
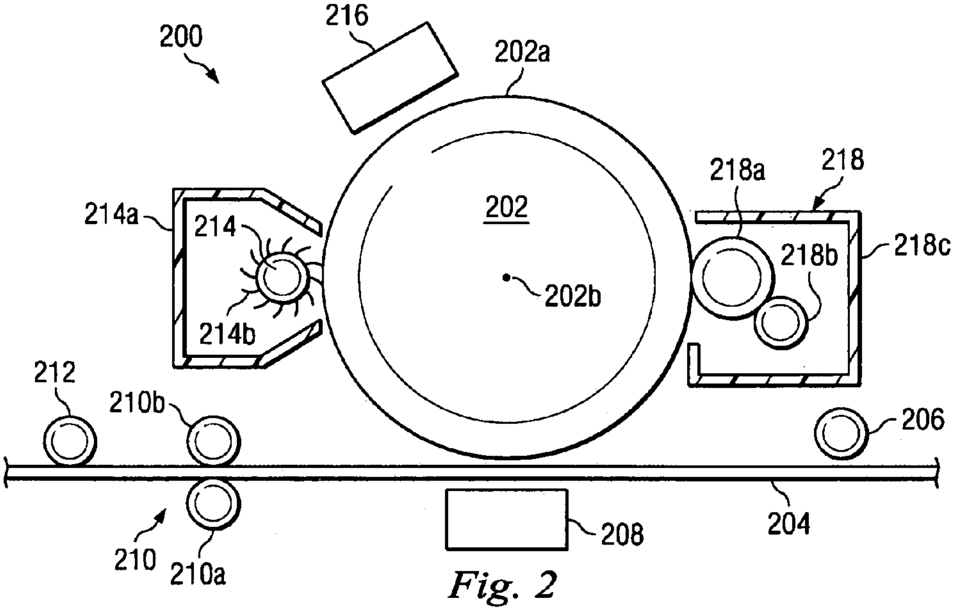
FIG. 2 is a diagrammatic view illustrating an embodiment of a printing device.

Referring now to FIG. 2, a conventional printing device 200 is illustrated. The printing device 200 includes a photoconductor drum 202 having a charging surface 202$a$ and a rotation axis 202$b$. In an embodiment, the photoconductor drum 202 may be a variety of photoconductors known in the art such as, for example, an Organic Photo Conductor (OPC), a photoconductor belt, a photoconductor plate, combinations thereof, or a variety of other photoconductors known in the art. A printing medium path 204 is located adjacent the photoconductor drum 202. An input engine 206 is located adjacent the printing medium path 204. A first charging member 208 is located adjacent the printing medium path 204 and opposite the photoconductor drum 202. A fusing device 210 is located adjacent the printing medium path 204 and includes a fuser 210$a$ and a fusing engine 210$b$ located on opposite sides of the printing medium path 204. An output engine 212 is located adjacent the printing medium path 204. A cleaning member 214 is located in a housing 214$a$ and adjacent the photoconductor drum 202 such that a plurality of cleaning fins 214$b$ on the cleaning member 214 may engage the charging surface 202$a$ of the photoconductor drum 202. A second charging member 216 is located adjacent the photoconductor drum 202. A toner application device 218 is located adjacent the photoconductor drum 202 and includes a plurality of toner application members 218$a$ and 218$b$ located in a housing 218$c$.

Figure 3:
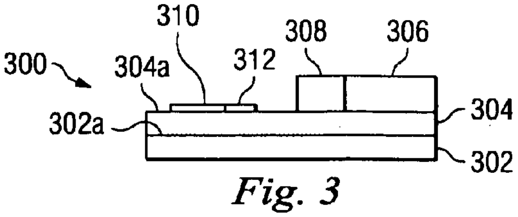
FIG. 3 is a side view illustrating an embodiment of an image producing apparatus used with the printing device of FIG. 2.

Referring now to FIG. 3, an image producing apparatus 300 is illustrated. The image producing apparatus 300 includes a substrate 302 having a top surface 302$a$. A control layer 304 includes a top surface 304$a$, is coupled to the top surface 302$a$ of the substrate 302, and includes a variety of conventional control circuitry known in the art. A photonic energy device 306 is coupled to the top surface 304$a$ of the control layer 304 and may be controlled by the control layer 304. In an embodiment, the photonic energy device 306 may be, for example, a laser, a controlled pulse laser, a light emitting device (LED), or a variety of equivalent photonic energy devices known in the art. An optics device 308 is positioned adjacent the photonic energy device 306. In an embodiment, the optics device 308 includes a static optics device operable to focus a photonic energy beam from the photonic energy device 306. A reflecting member 310 is located proximate the photonic energy device 306 and the optics device 308 on the top surface 304$a$ of the control layer 304 and, in an embodiment, is coupled to the top surface 304$a$ of the control layer 304 by a support structure 312. In an embodiment, the support structure 312 and/or the reflecting member 310 are fabricated from a piezoelectric material known in the art such as, for example, ammonium dihydrogen phosphate, potassium dihydrogen phosphate, barium sodium niobate, barium titanate (BaTiO3), Lithium Niobate, Lithium tantalate, Lead Zirconate Titanate (PZT-2, PZT-4, PZT-4D, PZT-5A, PZT-5H, PZT-5J, PZT-7A, PZT-8), Bismuth Germanate, Quartz, Rochelle Salt, Polyvinylidene Flouride, Cadmium Sulfide, Gallium Arsenide, Tellurium Dioxide, Zinc Oxide, and/or Zinc Sulfide, each which may be doped onto or built up as part of the image producing apparatus 300. In an embodiment, the image producing apparatus 300 may include a layer of transparent material such as, for example, transparent silicon, pyrex, glass, and/or a variety of other transparent materials known in the art, in order to protect the components of image producing apparatus 300.

Referring now to FIGS. 2, 3, 4$a$, 4$b$, and 4$c$, a method 400 for producing an image is illustrated. In the illustrations describing the method 400, for clarity, some components have been illustrated larger than normal such that the illustration is not to scale. The method 400 begins at step 402 where printing device 200 including the photoconductor drum 202 is provided. In an exemplary embodiment, the printing device 200 may be coupled to the information handling system 100, described above with respect to FIG. 1, and controlled by the microprocessor 102, described above with respect to FIG. 1. The image producing apparatus 300 including the photonic energy device 306 and the reflecting member 310 is positioned adjacent the photoconductor drum 202 using methods known in the art, as illustrated in FIGS. 4$b$ and 4$c$. The method 400 then proceeds to step 404 where the photoconductor drum 202 is charged. The photoconductor drum 202 rotates about the rotation axis 202*b* in a direction A, and during the rotation of the photoconductor drum 202, the cleaning fins 214*b* on the cleaning member 214 engage the surface 202 of the photoconductor drum 202 to clean off a waste toner 402*a* that may exist due to prior use of the photoconductor drum 202. Further rotation of the photoconductor drum 202 allows the cleaned surface 202*a* of the photoconductor drum 202 to be positioned adjacent the second charging member 216, which charges the surface 202*a* of the photoconductor drum 202 using methods known in the art.

Referring now to FIGS. 4*a*, 4*b*, 4*d*, 4*e*, 4*f*, 4*g*, 4*h*, and 4*i*, the method 400 proceeds to step 406 where portions of the photoconductor drum 202 are discharged. The control layer 304 supplies an electrical voltage to the support structure 312 using methods known in the art which, due to the material the support structure 312 is fabricated from, results in the deformation of the support structure 312.

Figure 4A:
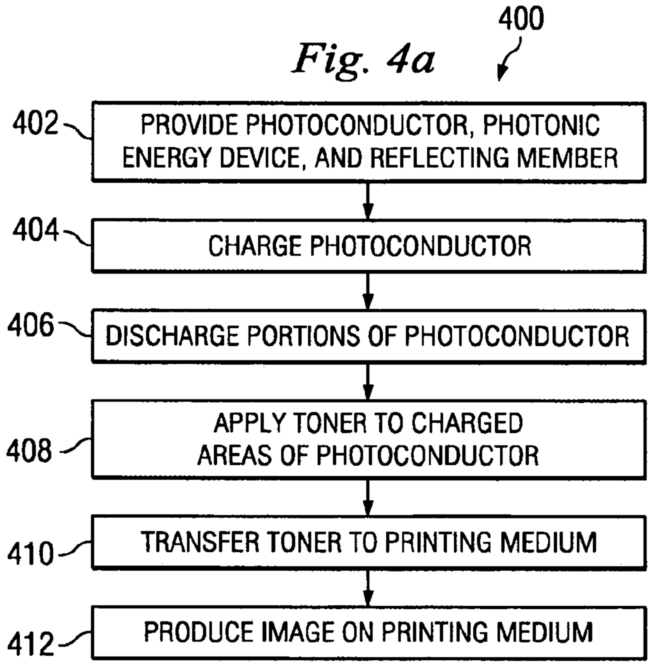
FIG. 4*a* is a flow chart illustrating an embodiment of a method for producing an image.
Figure 4B:
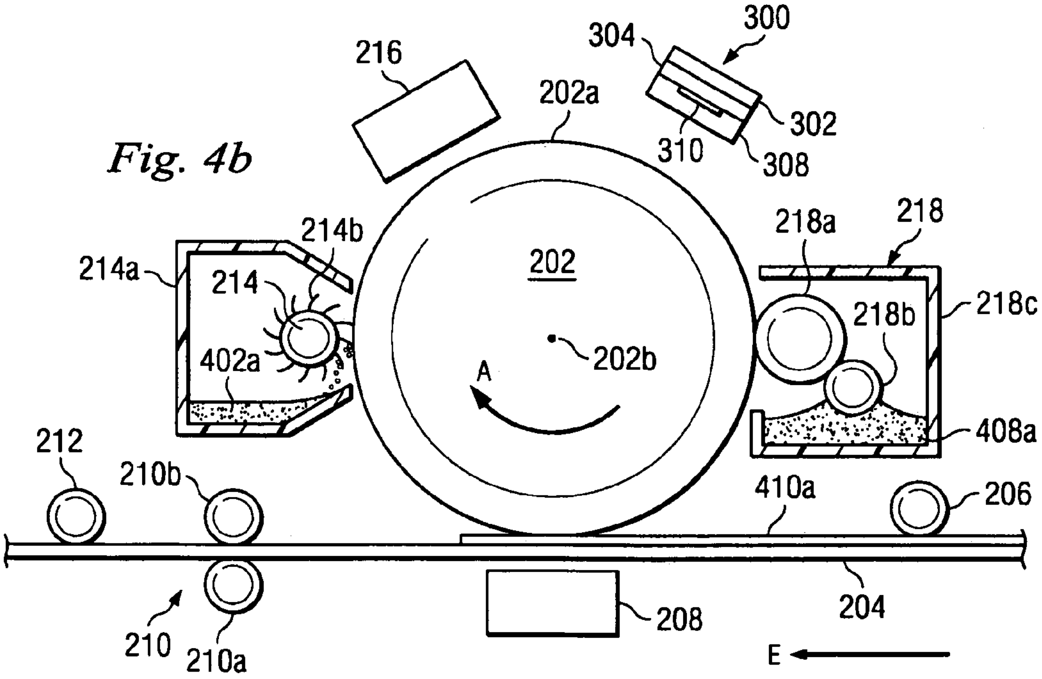
FIG. 4*b* is a diagrammatic view illustrating an embodiment of the image producing apparatus of FIG. 3 positioned adjacent the printing device of FIG. 2.
Figure 4C:
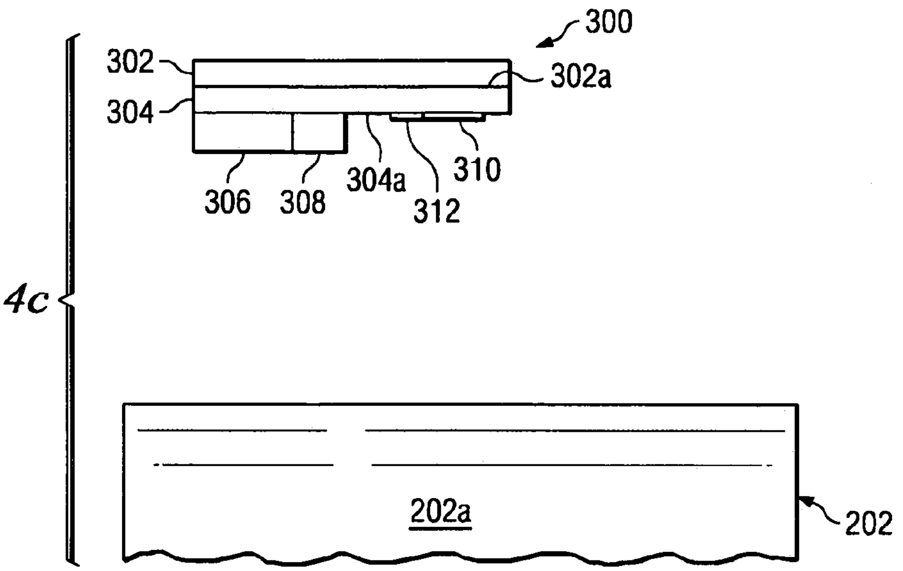
FIG. 4*c* is a side view illustrating an embodiment of the image producing apparatus of FIG. 3 positioned adjacent a photoconductor drum.
Figure 4D:
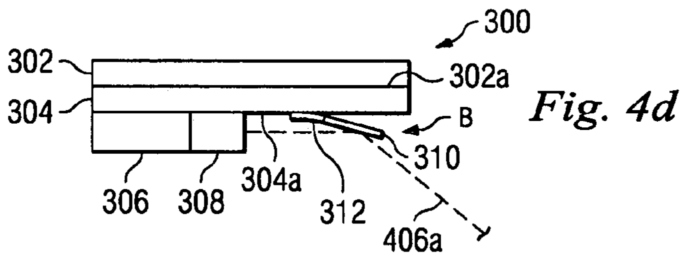
FIG. 4*d* is a side view illustrating an embodiment of the operation of the image producing apparatus of FIG. 3.
Figure 4E:
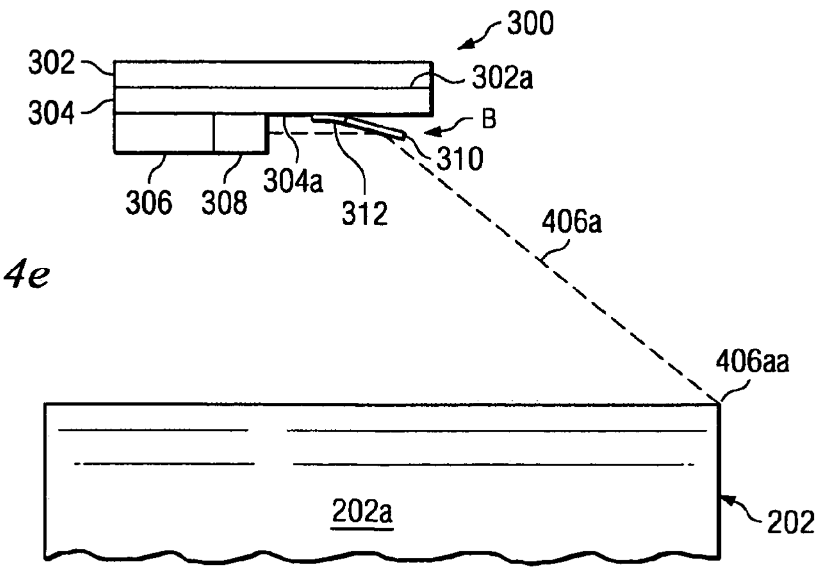
FIG. 4*e* is a side view illustrating an embodiment of the operation of the image producing apparatus of FIG. 4*b*.

In an embodiment, a relatively low electrical voltage is supplied from the control layer 304 to the support structure 312, resulting in the deformation of the support structure 312 illustrated in FIGS. 4*d* and 4*e*. In an embodiment, the electrical voltage may be a sinusoidal voltage in order to create a sinusoidal bending pattern in the support structure 312. The deformation of the support structure 312 positions the reflecting member 310 in an orientation B. The photonic energy device 306 is then activated, which sends a photonic energy beam 406*a* through the optics device 308 and towards the reflecting member 310. The photonic energy beam 406*a* is then reflected off the reflecting member 310 and onto an edge 406*aa* of the surface 202*a* of the photoconductor drum 202. The contact of the photonic energy beam 406*a* and the surface 202*a* of the photoconductor drum 202 discharges the edge 406*aa* of the surface 202*a* which had been charged in step 404 of the method 400.

Figure 4F:
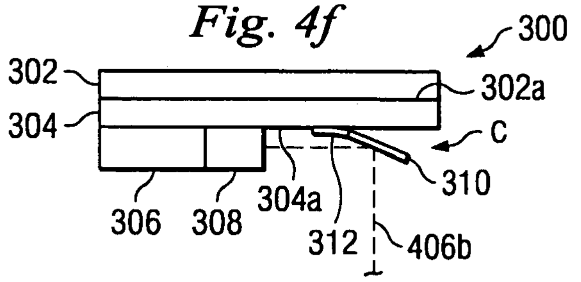
FIG. 4*f* is a side view illustrating an embodiment of the operation of the image producing apparatus of FIG. 3.
Figure 4G:
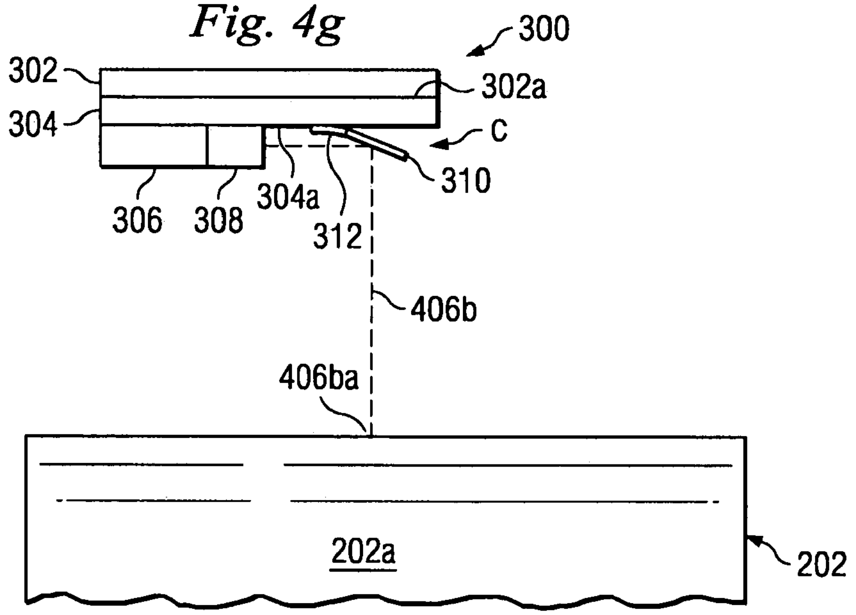
FIG. 4*g* is a side view illustrating an embodiment of the operation of the image producing apparatus of FIG. 4*b*.

In an embodiment, a relatively average electrical voltage is supplied from the control layer 304 to the support structure 312, resulting in the deformation of the support structure 312 illustrated in FIGS. 4*f* and 4*g*. In an embodiment, the electrical voltage may be a sinusoidal voltage in order to create a sinusoidal bending pattern in the support structure 312. The deformation of the support structure 312 positions the reflecting member 310 in an orientation C. The photonic energy device 306 is then activated, which sends a photonic energy beam 406*b* through the optics device 308 and towards the reflecting member 310. The photonic energy beam 406*b* is then reflected off the reflecting member 310 and onto a portion 406*ba* of the surface 202*a* of the photoconductor drum 202. The contact of the photonic energy beam 406*b* and the surface 202*a* of the photoconductor drum 202 discharges the portion 406*ba* of the surface 202*a* which had been charged in step 404 of the method 400.

Figure 4H:
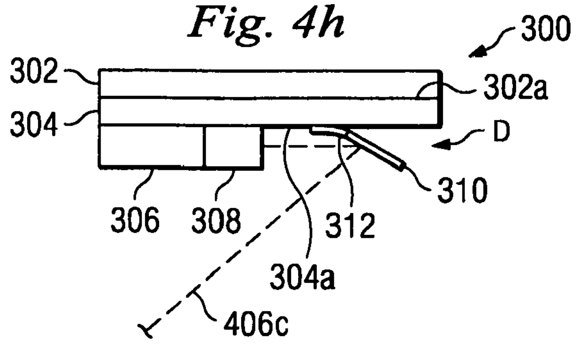
FIG. 4*h* is a side view illustrating an embodiment of the operation of the image producing apparatus of FIG. 3.
Figure 4I:
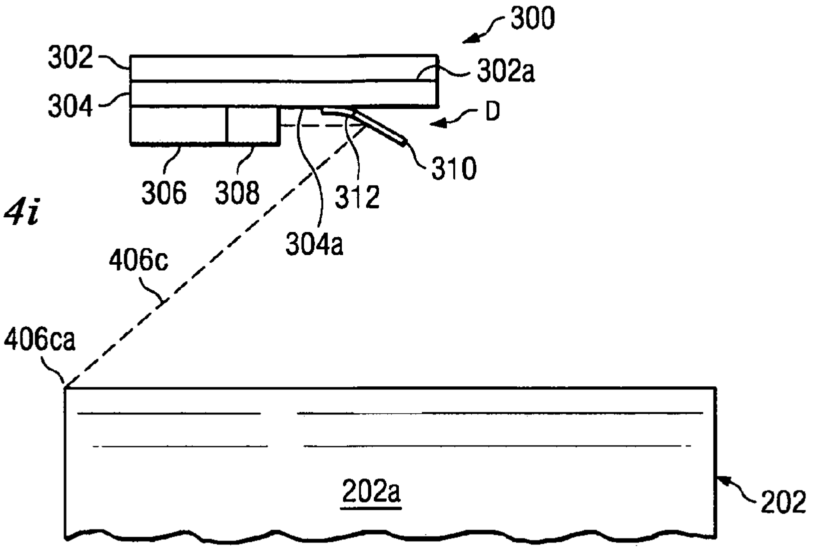
FIG. 4*i* is a side view illustrating an embodiment of the operation of the image producing apparatus of FIG. 4*b*.

In an embodiment, a relatively large electrical voltage is supplied from the control layer 304 to the support structure 312, resulting in the deformation of the support structure 312 illustrated in FIGS. 4*h* and 4*i*. In an embodiment, the electrical voltage may be a sinusoidal voltage in order to create a sinusoidal bending pattern in the support structure 312. The deformation of the support structure 312 positions the reflecting member 310 in an orientation D. The photonic energy device 306 is then activated, which sends a photonic energy beam 406*c* through the optics device 308 and towards the reflecting member 310. The photonic energy beam 406*c* is then reflected off the reflecting member 310 and onto an edge 406*ca* of the surface 202*a* of the photoconductor drum 202. The contact of the photonic energy beam 406*c* and the surface 202*a* of the photoconductor drum 202 discharges the edge 406*ca* of the surface 202*a* which had been charged in step 404 of the method 400.

In an embodiment, different electrical voltages may be supplied by the control layer 304 in order to deform the support structure 312 such that different photonic energy beams such as, for example, the photonic energy beams 406*a*, 406*b*, and 406*c* linearly scan across the surface 202*a* of the photoconductor drum 202 as the photoconductor drum 202 rotates in the direction A in order to discharge portions on the surface 202*a* of the photoconductor drum 202 corresponding to an image to be produced. In an embodiment, rather than being a relatively rigid reflecting member 310 coupled to a deformable support structure 312, as illustrated in FIGS. 4*d*, 4*e*, 4*f*, 4*g*, 4*h*, and 4*i*, a deformable reflecting member may replace the reflecting member 310 and support structure 312 combination such that the deformable reflecting member deforms upon application of an electrical voltage, which allows reflection of the photonic energy beam in substantially the same manner as described above for FIGS. 4*d*, 4*e*, 4*f*, 4*g*, 4*h*, and 4*i*.

Referring now to FIGS. 4*a* and 4*b*, the method 400 proceeds to step 408 where toner is applied to the charged areas of the photoconductor drum 202. The photoconductor drum 202 continues to rotate in the direction A, which results in the partially charged surface 202*a* of the photoconductor drum 202 being positioned adjacent the toner application device 218. The toner application members 218*a* and 218*b* then supply a toner 408*a* adjacent the photoconductor drum 202, and as a result of the remaining charge on portions of the surface 202*a* of the photoconductor drum 202, the toner 408*a* is drawn to and held on the portions of the surface 202*a* which have not been discharged by the image producing apparatus 300 in step 406 of the method 400.

The method 400 then proceeds to step 410 where the toner 408*a* is transferred to a printing medium. A printing medium 410*a* such as, for example, paper, is supplied. The printing medium 410*a* is engaged by the input engine 206 and moved along the paper path 204 in a direction E such that it is positioned adjacent the first charging member 208. The first charging member 208 charges the printing medium 410*a* such that the charge level of the printing medium 410*a* is greater than the charge level given to the charging surface 202*a* of the photoconductor drum 202 by the second charging member 216 in step 404 of the method 400. As the photoconductor drum 202 continues to rotate in the direction A and the printing medium 410*a* continues to move in the direction E, the portions of the charging surface 202*a* of the photoconductor drum 202 including the toner 408*a* are positioned adjacent the charged printing medium 410*a*. Because the printing medium 410*a* is charged at a higher level than the surface 202*a* of the photoconductor drum 202, the toner is drawn to and held by the printing medium 410*a*.

The method 400 then proceeds to step 412 where an image is produced on the printing medium 410*a*. The printing medium 410*a* continues to move along the paper path 204 in the direction E until the printing medium 410*a* engages the fuser engine 210*b* and is adjacent the fuser 210*a*. The fuser 210*a* heats the toner 408*a* to its melting point and the fuser engine 210*b* presses the toner 408*a* into the printing medium 410*a*, providing an image on the printing medium 410*a*. The printing medium 410*a* then engages the output engine 212, which moves the printing medium 410*a* out of the paper path 204. Thus, an image producing apparatus 300 is provided which is relatively cheap to produce and maintain compared to a conventional image producing apparatus, exhibits a lower failure rate than a conventional image producing apparatus, and provides increased scalability and speed compared to a conventional image producing apparatus.

Figure 5:
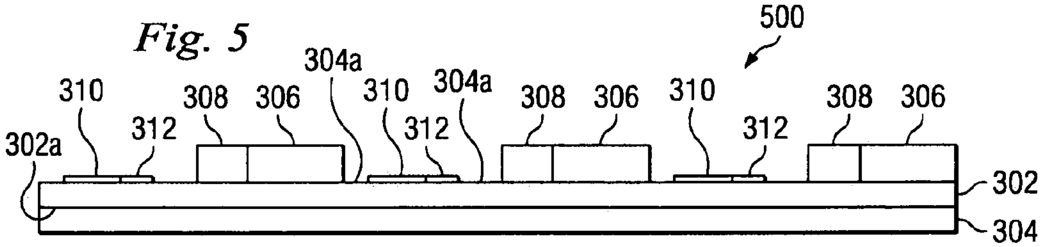
FIG. 5 is a side view illustrating an embodiment of an image producing apparatus.

Referring now to FIG. 5, in an alternative embodiment, an image producing apparatus 500 is illustrated. The image producing apparatus 500 is substantially similar in design and operation to the image producing apparatus 300 described above with respect to FIGS. 1, 2, 3, 4*a*, 4*b*, 4*c*, 4*d*, 4*e*, 4*f*, 4*g*, 4*h*, and 4*i*, with the provision of a plurality photonic energy devices 306, a plurality of optics devices 308, and a plurality of reflecting members 310 and support structures 312, coupled to the top surface 304*a* of the control layer 302 in place of the single photonic energy device 306, optics device 308, reflecting member 310 and support structure 312 of image producing apparatus 300. In an embodiment, the plurality of photonic energy devices 306 may be, for example, a laser, a controlled pulse laser, a light emitting device (LED), or a variety of equivalent photonic energy devices known in the art. In an embodiment, the support structure 312 and/or the reflecting member 310 are fabricated from a piezoelectric material known in the art such as, for example, ammonium dihydrogen phosphate, potassium dihydrogen phosphate, barium sodium niobate, barium titanate (BaTiO3), Lithium Niobate, Lithium tantalate, Lead Zirconate Titanate (PZT-2, PZT-4, PZT-4D, PZT-5A, PZT-5H, PZT-5J, PZT-7A, PZT-8), Bismuth Germanate, Quartz, Rochelle Salt, Polyvinylidene Flouride, Cadmium Sulfide, Gallium Arsenide, Tellurium Dioxide, Zinc Oxide, and/or Zinc Sulfide, each which may be doped onto or built up as part of the image producing apparatus 500. In an embodiment, the image producing apparatus 500 may include a layer of transparent material such as, for example, transparent silicon, pyrex, glass, and/or a variety of other transparent materials known in the art, in order to protect the components of image producing apparatus 500.

Figure 6A:
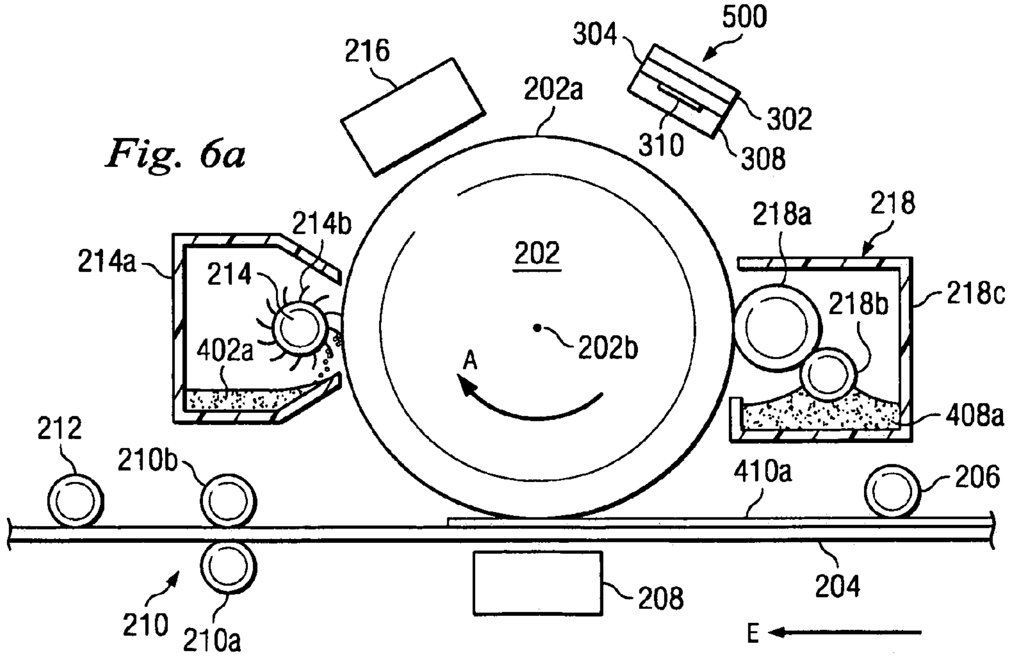
FIG. 6*a* is a diagrammatic view illustrating an embodiment of the image producing apparatus of FIG. 5 positioned adjacent the printing device of FIG. 2.
Figure 6B:
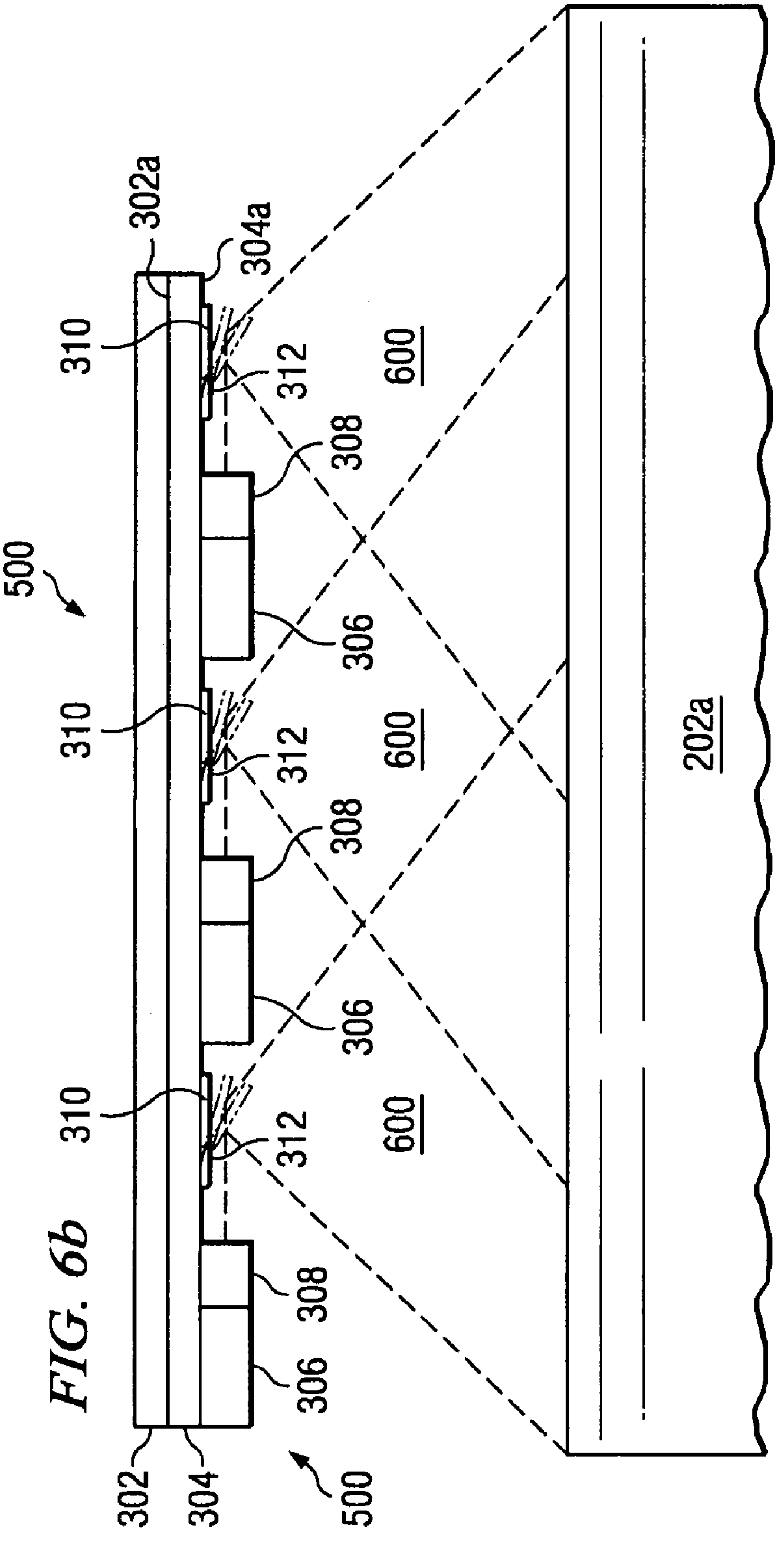
FIG. 6*b* is a side view illustrating an embodiment of the operation of the image producing apparatus of FIG. 6*a*.

Referring now to FIGS. 4*a*, 6*a*, and 6*b*, the image producing apparatus 500 may be operated in substantially the same manner as the image producing apparatus 300 using method 400, with the provision of a modified step 406, where the surface 202*a* of the photoconductor drum 202 is discharged. In the illustrations 6*a* and 6*b*, for clarity, some components have been illustrated larger than normal such that the illustration is not to scale. At step 406, the control layer 304 may apply varying electrical voltages to the support structures 312 in order to deform the support structures 312 and position the reflecting members 310 in different orientations such as, for example, the orientations B, C, and D, illustrated in FIGS. 4*d*, 4*f*, and 4*h*. In an embodiment, the electrical voltage may be a sinusoidal voltage in order to create a sinusoidal bending patterns in the support structures 312. The photonic energy devices 306 are then activated, which sends a plurality of photonic energy beams through the optics devices 308 and towards the reflecting members 310. The photonic energy beams are then reflected off the reflecting members 310 and onto the surface 202*a* of the photoconductor drum 202, each reflecting member 310 having a possible beam path 600 which provides a linear scan across the surface 202*a* of the photoconductor drum 202. The contact of the photonic energy beams and the surface 202*a* of the photoconductor drum 202 discharges the surface 202*a* which had been charged in step 404 of the method 400. In an embodiment, the possible beam paths 600 overlap such that any one beam path 600 is redundant, as illustrated in FIG. 6*b*, and failure of any one reflecting member 310 or photonic energy devices 306 may be compensated for by adjacent reflecting members 310 and photonic energy devices 306. In an embodiment, an image producing apparatus may include a plurality of the image producing apparatus 500 described above in order to provide a two dimensional multilinear scanning array. Thus, an image producing apparatus 500 is provided which is relatively cheap to produce and maintain compared to a conventional image producing apparatus, exhibits a lower failure rate than a conventional image producing apparatus, and provides increases scalability and speed compared to a conventional image producing apparatus.

Figure 7:
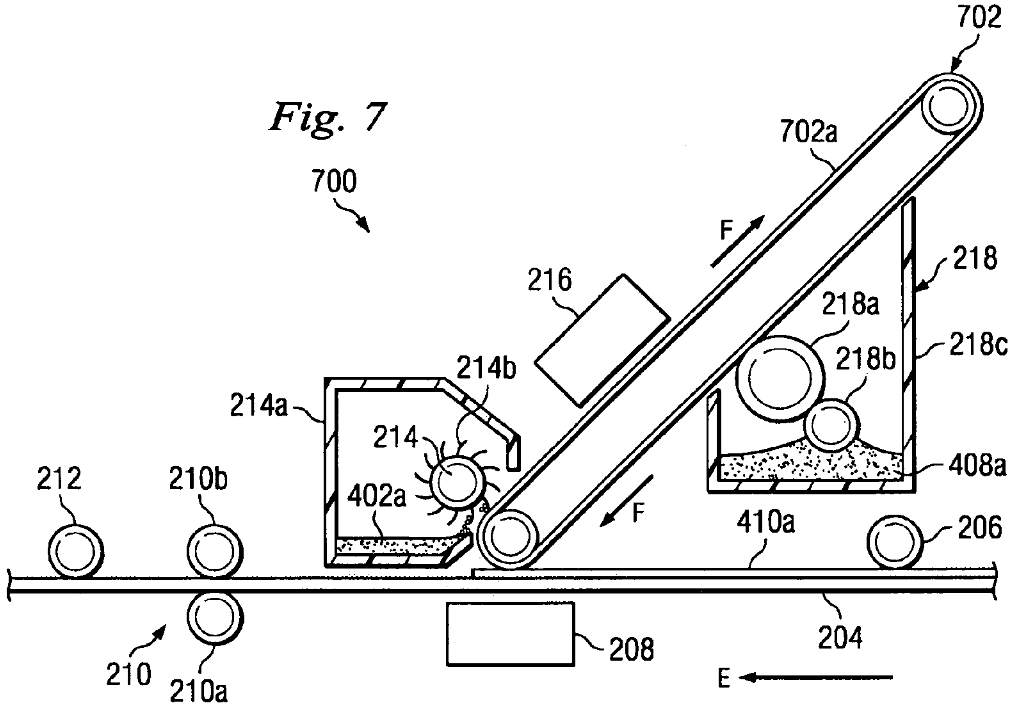
FIG. 7 is a diagrammatic view illustrating an embodiment of a printing device.
Figure 9A:
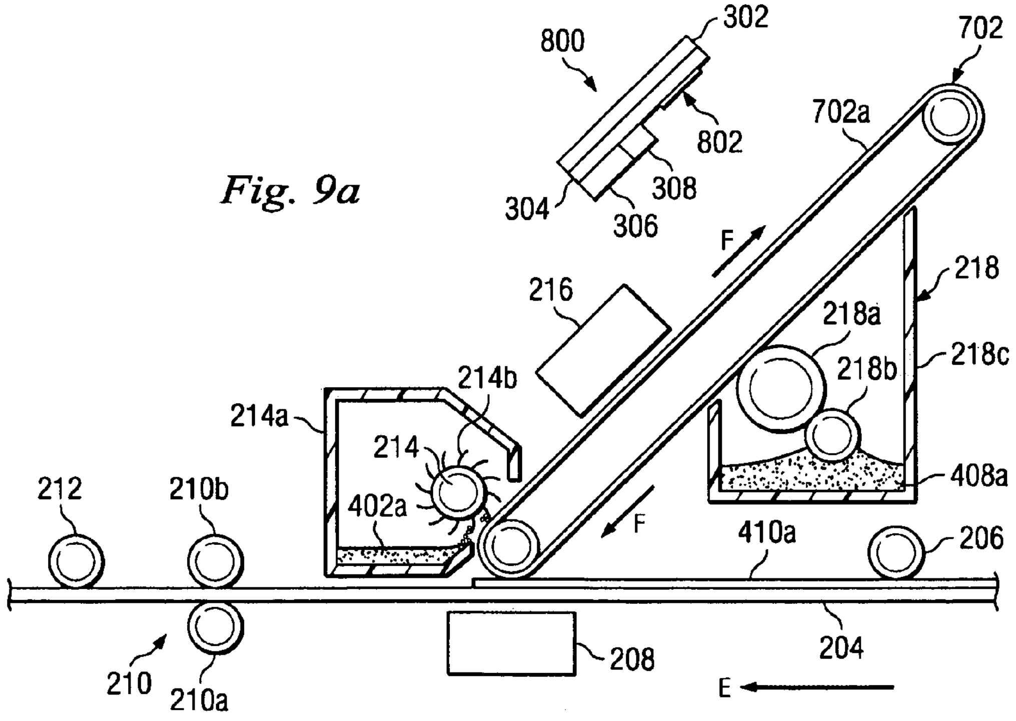
FIG. 9*a* is a diagrammatic view illustrating an embodiment of the image producing apparatus of FIG. 8 positioned adjacent the printing device of FIG. 7.

Referring now to FIG. 7, in an embodiment, a printing device 700 is substantially similar in design and operation to the printing device 200, described above with reference to FIG. 2, with the provision of a photoconductor belt 702 replacing the photoconductor drum 202. The photoconductor belt 702 includes a charging surface 702*a* which is operable to move in a direction F, as illustrated in FIG. 7.

Figure 8:
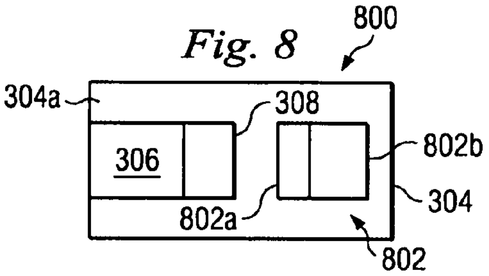
FIG. 8 is a top view illustrating an embodiment of an image producing apparatus.

Referring now to FIG. 8, in an embodiment, an image producing apparatus 800 is substantially similar in design and operation to the image producing apparatus 300 described above with respect to FIG. 3, with the provision of a reflecting member 802 replacing the reflecting member 310 and the support structure 312. The reflecting member 802 includes a first deformable member 802*a* which is coupled to the top surface 304*a* of the control layer 304. A second reflective deformable member 802*b* is coupled to the first deformable member 802*a*. In an embodiment, the first deformable member 802*a* and the second reflective deformable member 802*b* are operable to deform in different orientations upon the application of an electrical voltage. In an embodiment, the first deformable member 802*a* and the second reflective deformable member 802*b* are fabricated from different piezoelectric materials. In an embodiment, the first deformable member 802*a* and the second reflective deformable member 802*b* may be fabricated from a piezoelectric material known in the art such as, for example, ammonium dihydrogen phosphate, potassium dihydrogen phosphate, barium sodium niobate, barium titanate (BaTiO3), Lithium Niobate, Lithium tantalate, Lead Zirconate Titanate (PZT-2, PZT-4, PZT-4D, PZT-5A, PZT-5H, PZT-5J, PZT-7A, PZT-8), Bismuth Germanate, Quartz, Rochelle Salt, Polyvinylidene Flouride, Cadmium Sulfide, Gallium Arsenide, Tellurium Dioxide, Zinc Oxide, and/or Zinc Sulfide, each which may be doped onto or built up as part of the image producing apparatus 800. In an embodiment, the image producing apparatus 800 may include a layer of transparent material such as, for example, transparent silicon, pyrex, glass, and/or a variety of other transparent materials known in the art, in order to protect the components of image producing apparatus 800.

Figure 9B:
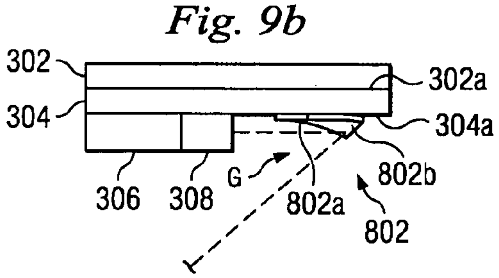
FIG. 9*b* is a side view illustrating an embodiment of the operation of the image producing apparatus of FIG. 8.
Figure 9C:
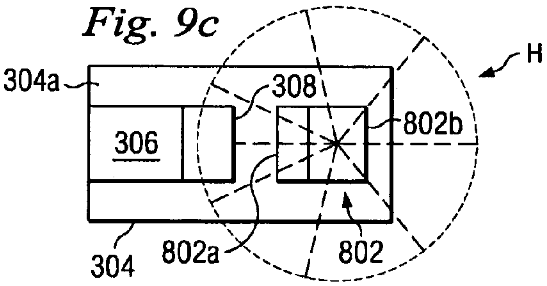
FIG. 9*c* is a top view illustrating an embodiment of the operation of the image producing apparatus of FIG. 8.
Figure 9D:
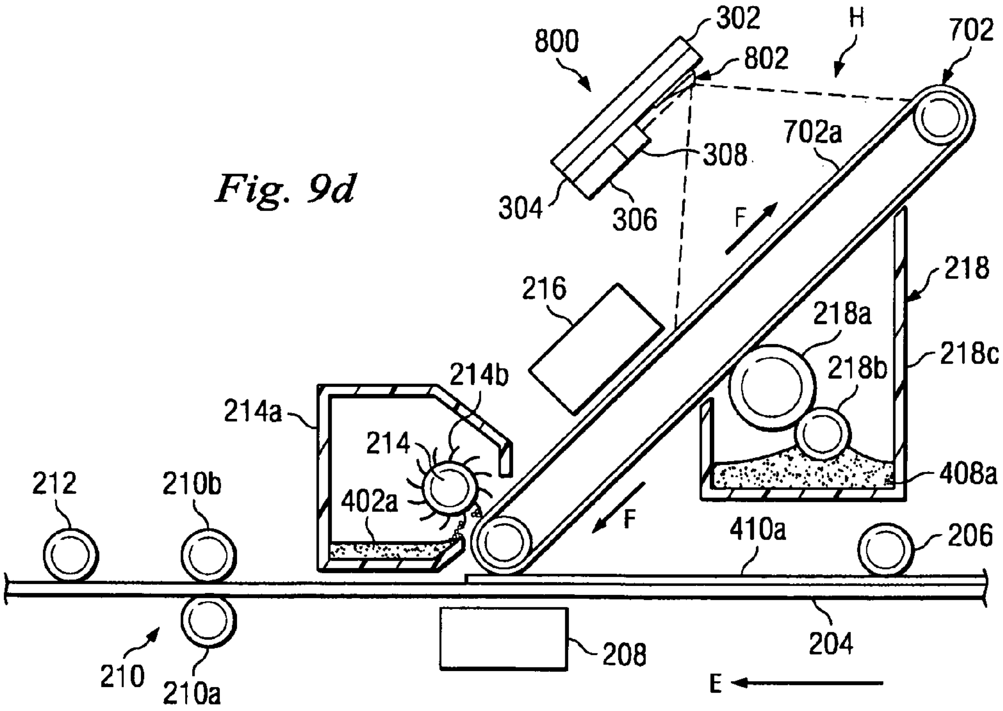
FIG. 9*d* is a diagrammatic view illustrating an embodiment of the operation of the image producing apparatus of FIG. 9*a*.
Figure 9E:
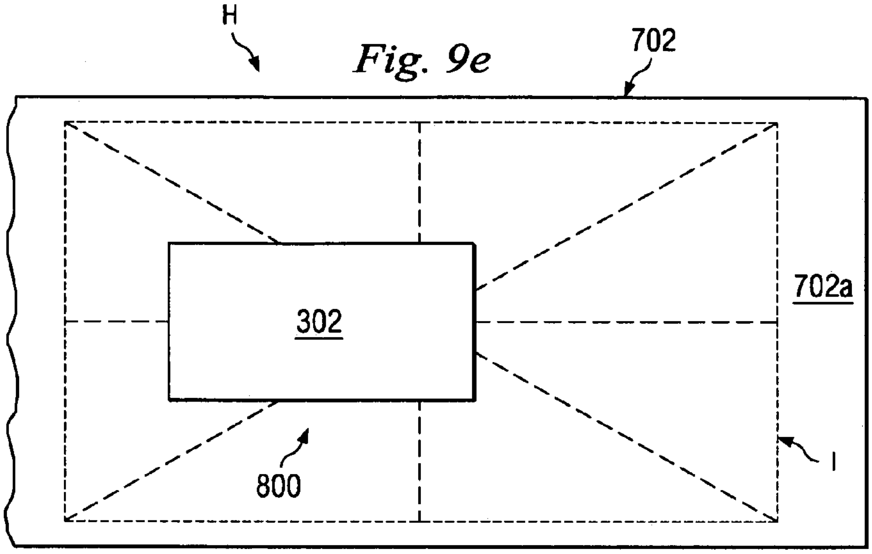
FIG. 9*e* is a top view illustrating an embodiment of the operation of the image producing apparatus of FIG. 9*a*.
Figure 11A:
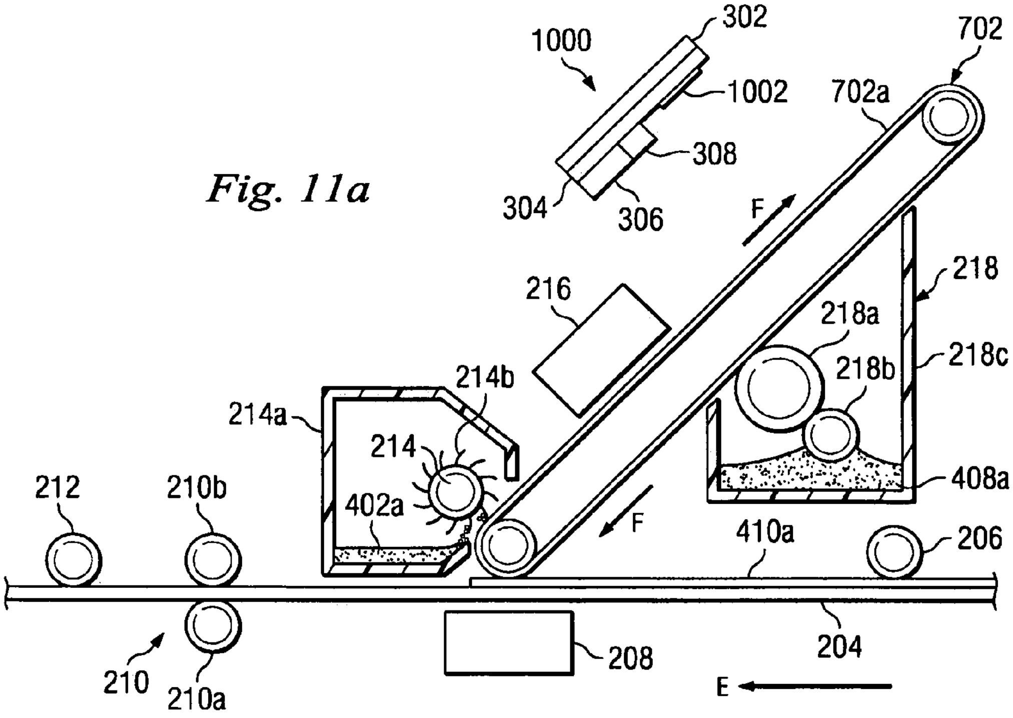
FIG. 11*a* is a diagrammatic view illustrating an embodiment of the image producing apparatus of FIG. 10 positioned adjacent the printing device of FIG. 7.

Referring now to FIGS. 7, 9*a*, 9*b*, 9*c*, 9*d*, and 9*e*, the image producing apparatus 800 may be positioned adjacent the printing device 700 and operated in substantially the same manner as the image producing apparatus 300 and the printing device 200 according to the method 400, with the provision of a modified step 406. In the illustrations 9*a* and 9*d*, for clarity, some components have been illustrated larger than normal such that the illustration is not to scale. At step 406, the control layer 304 applies an electrical voltage to the reflecting member 802. Due to the reflecting member 802 including the first deformable member 802*a* and the second reflective deformable member 802*b* which are operable to deform in different orientations, the application of the electrical voltage causes the reflecting member 802 to deform into an orientation G, as illustrated in FIG. 9*b*. In an embodiment, the electrical voltage may be a sinusoidal voltage in order to create a sinusoidal bending pattern in the first deformable member 802*a* and the second deformable member 802*b*. The photonic energy device 306 is then activated, which sends a photonic energy beam through the optics device 308 and towards the reflecting member 802. The photonic energy beam is then reflected off the second reflective deformable member 802*b* on reflecting member 802 and towards the surface 702*a* of the photoconductor belt 702. Application of different electrical voltages from the control layer 304 to the reflecting member 802 result in different deformation orientations of the reflecting member 802, which allow the photonic energy beam from the photonic energy device 306 to be reflected in variety of directions H such that the photonic energy beam may contact a portion I of the surface 702*a* on the photoconductor belt 702, as illustrated in FIGS. 9*c*, 9*d*, and 9*e*. The contact of the photonic energy beam and the surface 702*a* of the photoconductor drum 702 discharges the surface 702*a* which had been charged in step 404 of the method 400. Thus, an image producing apparatus 800 is provided which is relatively cheap to produce and maintain compared to a conventional image producing apparatus, exhibits a lower failure rate than a conventional image producing apparatus, and provides increased scalability and speed compared to a conventional image producing apparatus.

Figure 10:
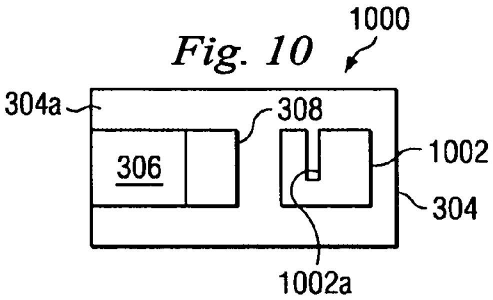
FIG. 10 is a top view illustrating an embodiment of an image producing apparatus.

Referring now to FIG. 10, in an embodiment, an image producing apparatus 1000 is substantially similar in design and operation to the image producing apparatus 300 described above with respect to FIG. 3, with the provision of a reflecting member 1002 replacing the reflecting member 310 and the support structure 312. The reflecting member 1002 is coupled to the control layer 304 and defines a channel 1002*a* extending into the reflecting member 1002. In an embodiment, the reflecting member 1002 may be fabricated from a piezoelectric material known in the art such as, for example, ammonium dihydrogen phosphate, potassium dihydrogen phosphate, barium sodium niobate, barium titanate (BaTiO3), Lithium Niobate, Lithium tantalate, Lead Zirconate Titanate (PZT-2, PZT-4, PZT-4D, PZT-5A, PZT-5H, PZT-5J, PZT-7A, PZT-8), Bismuth Germanate, Quartz, Rochelle Salt, Polyvinylidene Flouride, Cadmium Sulfide, Gallium Arsenide, Tellurium Dioxide, Zinc Oxide, and/or Zinc Sulfide, each which may be doped onto or built up as part of the image producing apparatus 1000. In an embodiment, the photonic energy device 306 and the optics device 308 may be mounted offset from the position illustrated in FIG. 10. In an embodiment, the image producing apparatus 1000 may include a layer of transparent material such as, for example, transparent silicon, pyrex, glass, and/or a variety of other transparent materials known in the art, in order to protect the components of image producing apparatus 1000.

Figure 11B:
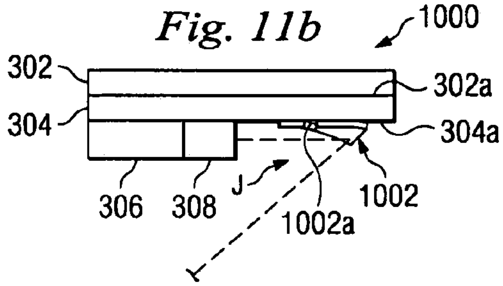
FIG. 11*b* is a side view illustrating an embodiment of the operation of the image producing apparatus of FIG. 10.
Figure 11C:
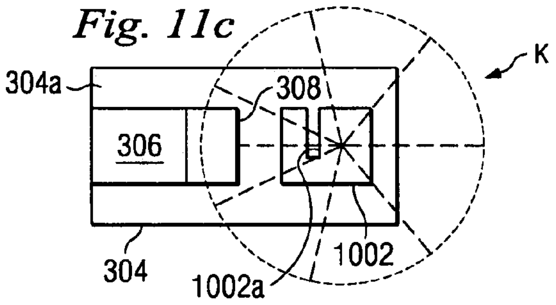
FIG. 11*c* is a top view illustrating an embodiment of the operation of the image producing apparatus of FIG. 10.
Figure 11D:
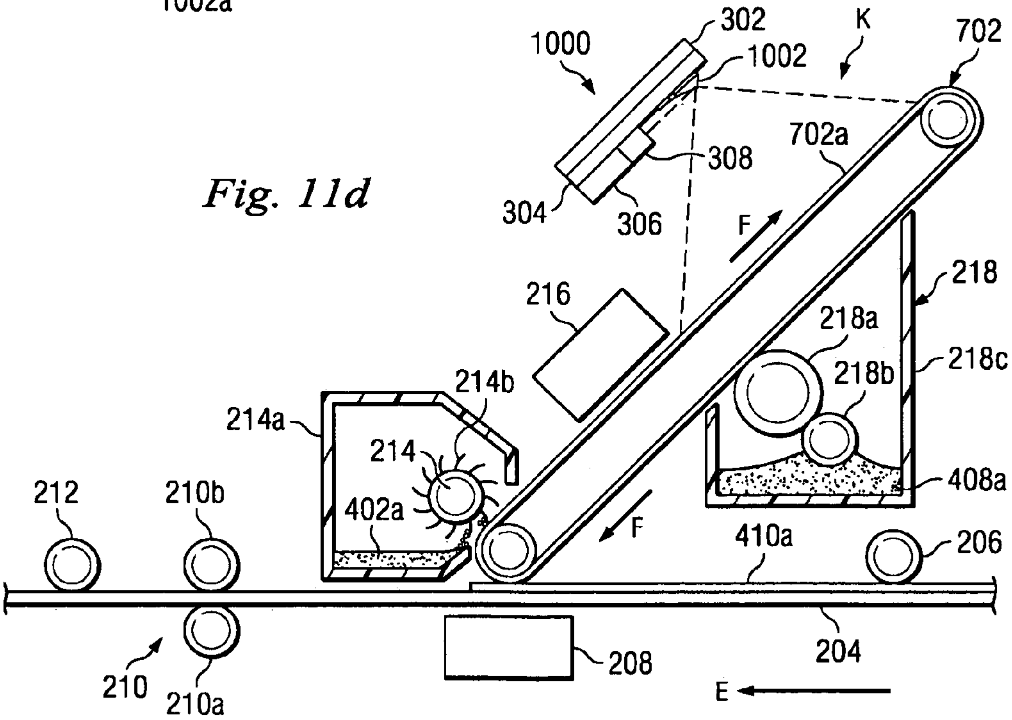
FIG. 11*d* is a diagrammatic view illustrating an embodiment of the operation of the image producing apparatus of FIG. 11*a*.
Figure 11E:
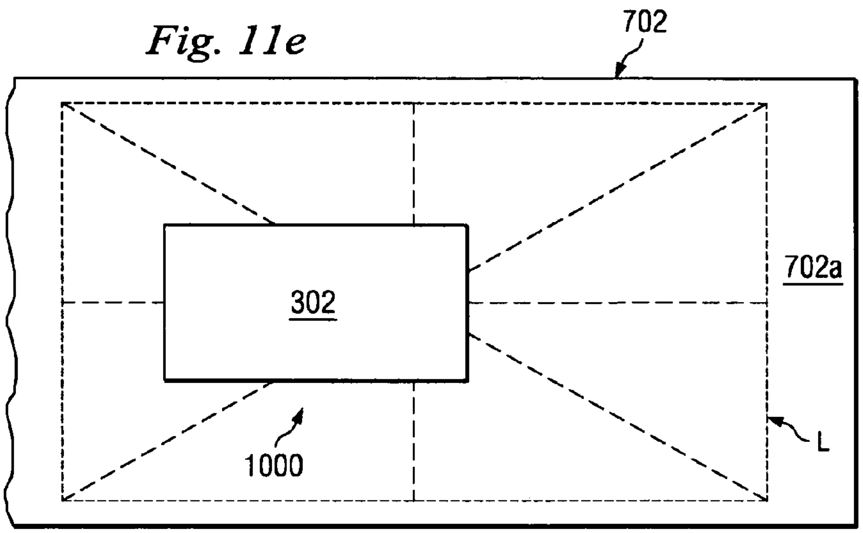
FIG. 11$e$ is a top view illustrating an embodiment of the operation of the image producing apparatus of FIG. 11$a$.

Referring now to FIGS. 7, 11*a*, 11*b*, 11*c*, 11*d*, and 11*e*, the image producing apparatus 1000 maybe be positioned adjacent the printing device 700 and operated in substantially the same manner as the image producing apparatus 300 and the printing device 200 according to the method 400, with the provision of a modified step 406. In the illustrations 11*a* and 11*d*, for clarity, some components have been illustrated larger than normal such that the illustration is not to scale. At step 406, the control layer 304 applies an electrical voltage to the reflecting member 1002. Due to the channel 1002*a* defined by reflecting member 1002, the application of the electrical voltage causes the reflecting member 1002 to deform into an orientation J, as illustrated in FIG. 11*b*. In an embodiment, the electrical voltage may be a sinusoidal voltage in order to create a sinusoidal bending pattern in reflecting member 1002. The photonic energy device 306 is then activated, which sends a photonic energy beam through the optics device 308 and towards the reflecting member 1002. The photonic energy beam is then reflected off the reflecting member 1002 and towards the surface 702*a* of the photoconductor belt 702. Application of different electrical voltages from the control layer 304 to the reflecting member 1002 result in different deformation orientations of the reflecting member 1002, which allow the photonic energy beam from the photonic energy device 306 to be reflected in variety of directions K such that the photonic energy beam may contact a portion L of the surface 702*a* on the photoconductor belt 702, as illustrated in FIGS. 11*c*, 11*d*, and 11*e*. In an embodiment, the photonic energy device 306 and the optics device 308 may be mounted offset from the position illustrated in FIG. 10 such that the photonic energy device 306 may direct a photonic energy beam towards the reflecting member 1002 at an angle relative to the photonic energy beam illustrated in FIG. 11*c* in order to take advantage of different orientations of the reflecting member 1002 upon the application of an electrical voltage. The contact of the photonic energy beam and the surface 702*a* of the photoconductor drum 702 discharges the surface 702*a* which had been charged in step 404 of the method 400. Thus, an image producing apparatus 1000 is provided which is relatively cheap to produce and maintain compared to a conventional image producing apparatus, exhibits a lower failure rate than a conventional image producing apparatus, and provides increased scalability and speed compared to a conventional image producing apparatus.

Figure 12:
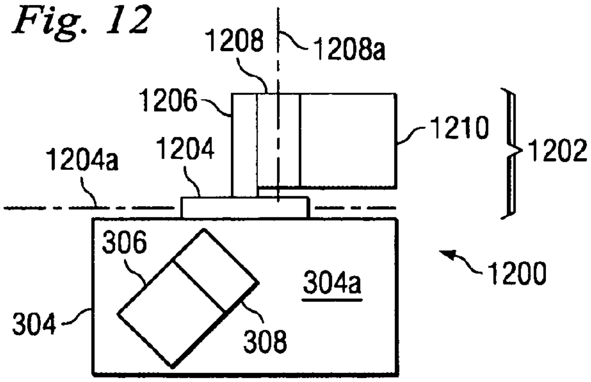
FIG. 12 is a top view illustrating an embodiment of an image producing apparatus.

Referring now to FIG. 12, in an embodiment, an image producing apparatus 1200 is substantially similar in design and operation to the image producing apparatus 300 described above with respect to FIG. 3, with the provision of a reflecting member 1202 replacing the reflecting member 310 and the support structure 312. The reflecting member 1202 is coupled to the control layer 304 and includes a first deformable member 1204 having a first axis 1204*a*. A support 1206 extends from the first deformable member 1204 and is operably coupled to the control layer 304. A second deformable member 1208 is coupled to the support 1206 and includes a second axis 1208*a* which is substantially perpendicular to the first axis 1208*a*. A reflecting device 1210 is coupled to the second deformable member 1208. In an embodiment, the first deformable member 1204 and the second deformable member 1208 may be fabricated from a piezoelectric material known in the art such as, for example, ammonium dihydrogen phosphate, potassium dihydrogen phosphate, barium sodium niobate, barium titanate (BaTiO3), Lithium Niobate, Lithium tantalate, Lead Zirconate Titanate (PZT-2, PZT-4, PZT-4D, PZT-5A, PZT-5H, PZT-5J, PZT-7A, PZT-8), Bismuth Germanate, Quartz, Rochelle Salt, Polyvinylidene Flouride, Cadmium Sulfide, Gallium Arsenide, Tellurium Dioxide, Zinc Oxide, and/or Zinc Sulfide, each which may be doped onto or built up as part of the image producing apparatus 1200. In an embodiment, the image producing apparatus 1200 may include a layer of transparent material such as, for example, transparent silicon, pyrex, glass, and/or a variety of other transparent materials known in the art, in order to protect the components of image producing apparatus 1200.

Figure 13:
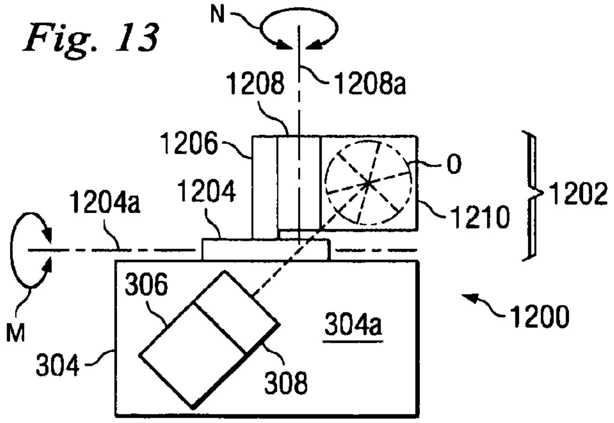
FIG. 13 is a top view illustrating an embodiment of the operation of the image producing apparatus of FIG. 12.

Referring now to FIG. 13, the image producing apparatus 1200 maybe be positioned adjacent the printing device 700 in substantially the same manner as the image producing apparatus 800 and 1000, described above with reference to FIGS. 9*a* and 11*a*, and operated in substantially the same manner as the image producing apparatus 300 and the printing device 200 according to the method 400, with the provision of a modified step 406. At step 406, the control layer 304 may apply an electrical voltage to the first deformable member 1204 and the second deformable member 1208. The application of the electrical voltage to the first deformable member 1204 causes the first deformable member 1204 to deform such that the support 1206, the second deformable member

1208, and the reflecting device 1210 rotate about the first axis 1204*a* in a direction M. The application of the electrical voltage to the second deformable member 1208 causes the reflecting device 1210 to rotate about the second axis 1208*a* in a direction N. In an embodiment, the electrical voltage may be a sinusoidal voltage in order to create a sinusoidal bending pattern in the first deformable member 1204 and the second deformable member 1208. The photonic energy device 306 is then activated, which sends a photonic energy beam through the optics device 308 and towards the reflecting device 1210. The photonic energy beam is then reflected off the reflecting device 1210 and towards the surface 702*a* of the photoconductor belt 702. Application of different electrical voltages from the control layer 304 to the first deformable member 1204 and the second deformable member 1208 result in different deformation orientations of the reflecting member reflecting device 1210, which allow the photonic energy beam from the photonic energy device 306 to be reflected in variety of directions O such that the photonic energy beam may contact a portion L of the surface 702*a* on the photoconductor belt 702, as illustrated in FIG. 11*e*. The contact of the photonic energy beam and the surface 702*a* of the photoconductor drum 702 discharges the surface 702*a* which had been charged in step 404 of the method 400. Thus, an image producing apparatus 1200 is provided which is relatively cheap to produce and maintain compared to a conventional image producing apparatus, exhibits a lower failure rate than a conventional image producing apparatus, and provides increased scalability and speed compared to a conventional image producing apparatus.

Referring now to FIG. 14, in an embodiment, an image producing apparatus 1400 is substantially similar in structure and operation to the image producing apparatus 300 described above with respect to FIG. 3, with the removal of the reflecting member 310 and the support structure 312 and the provision of a plurality of walls 1402*a* and 1402*b* extending from the top surface 304*a* of the control layer 304, a first reflecting member 1404 including a first deformable member 1404*a* having a deformation axis 1404*aa* and a first reflecting device 1404*b* coupled to the top surface of the control layer 304, a support beam 1406 extending from the wall 1402*b*, and a second reflecting member 1408 including a second deformable member 1408*a* and a second reflecting device 1408*b* coupled to the support beam 1406. The second deformable member 1408 is coupled to the control layer 304 through the wall 1402*b* and the support beam 1406. In an embodiment, the first deformable member 1404*a* and the second deformable member 1404*b* may be fabricated from a piezoelectric material known in the art such as, for example, ammonium dihydrogen phosphate, potassium dihydrogen phosphate, barium sodium niobate, barium titanate (BaTiO3), Lithium Niobate, Lithium tantalate, Lead Zirconate Titanate (PZT-2, PZT-4, PZT-4D, PZT-5A, PZT-5H, PZT-5J, PZT-7A, PZT-8), Bismuth Germanate, Quartz, Rochelle Salt, Polyvinylidene Flouride, Cadmium Sulfide, Gallium Arsenide, Tellurium Dioxide, Zinc Oxide, and/or Zinc Sulfide, each which may be doped onto or built up as part of the image producing apparatus 1400. In an embodiment, the image producing apparatus 1400 may include a layer of transparent material such as, for example, transparent silicon, pyrex, glass, and/or a variety of other transparent materials known in the art, in order to protect the components of image producing apparatus 1400.

Referring now to FIG. 15, the image producing apparatus 1400 may be positioned adjacent the printing device 700 in substantially the same manner as the image producing apparatus 800 and 1000, described above with reference to FIGS. 9*a* and 11*a*, and operated in substantially the same manner as the image producing apparatus 300 and the printing device 200 according to the method 400, with the provision of a modified step 406. At step 406, the control layer 304 may apply an electrical voltage to the first deformable member 1404*a* and/or the second deformable member 1408*a*. The application of the electrical voltage to the first deformable member 1404*a* causes the first deformable member 1404*a* to deform about the axis 1404*aa*. The application of the electrical voltage to the second deformable member 1408*a* causes the second deformable member 1408*a* to deform as illustrated in FIG. 15. In an embodiment, the electrical voltage may be a sinusoidal voltage in order to create a sinusoidal bending pattern in the first deformable member 1404*a* and the second deformable member 1408*a*. The photonic energy device 306 is then activated, which sends a photonic energy beam through the optics device 308 and towards the first reflecting device 1408*b*. The photonic energy beam is then reflected off the first reflecting device 1408*b* and towards the second reflecting device 1404*b*. The photonic energy beam is then reflected off the second reflecting device 1404*b* and towards the surface 702*a* of the photoconductor belt 702. Application of different electrical voltages from the control layer 304 to the first deformable member 1404*a* and the second deformable member 1408*a* result in different deformation orientations of the first reflecting member 1404 and the second reflecting member 1408, which allow the photonic energy beam from the photonic energy device 306 to be reflected in variety of directions such that the photonic energy beam may contact a substantially two dimensional area of the surface 702*a* on the photoconductor belt 702 similar to the portion L, as illustrated in FIG. 11*e*. The contact of the photonic energy beam and the surface 702*a* of the photoconductor drum 702 discharges the surface 702*a* which had been charged in step 404 of the method 400. Thus, an image producing apparatus 1400 is provided which is relatively cheap to produce and maintain compared to a conventional image producing apparatus, exhibits a lower failure rate than a conventional image producing apparatus, and provides increased scalability and speed compared to a conventional image producing apparatus.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An image producing apparatus, comprising:
- a photoconductor;
- a photonic energy device positioned adjacent the photoconductor; and
- a single reflecting member located on a support structure adjacent the photonic energy device, wherein the support structure is operable to deform upon application of an electrical voltage such that photonic energy from the photonic energy device may be reflected from the single reflecting member directly onto the photoconductor free of any additional reflecting members.

2. The apparatus of claim 1, wherein the photoconductor is chosen from the group consisting of a photoconductor drum, a photoconductor belt, a photoconductor plate, and combinations thereof.

3. The apparatus of claim 1, wherein the photonic energy device is chosen from the group consisting of a laser, a light emitting device (LED), and combinations thereof.

4. The apparatus of claim 1, wherein the support structure comprises a piezoelectric material.

5. The apparatus of claim 1, wherein the support structure is operable to deform into a first position upon application of a first electrical voltage in order to reflect photonic energy from the photonic energy device from the single reflecting member directly onto a first location on the photoconductor, and the support structure is operable to deform into a second position upon application of a second electrical voltage in order to reflect photonic energy from the photonic energy device from the single reflecting member directly onto a second location on the photoconductor.

6. The apparatus of claim 5, wherein the reflecting the photonic energy from the single reflecting member directly onto the first location and the second location comprises reflecting the photonic energy from the single reflecting member in at least two dimensions.

7. The apparatus of claim 1, further comprising:

a plurality of secondary photonic energy devices positioned adjacent the photoconductor, each secondary photonic energy device comprising a secondary single reflecting member located on a secondary support structure adjacent the secondary photonic energy device, wherein the secondary support structure is operable to deform upon application of an electrical voltage such that photonic energy from the secondary photonic energy device may be reflected from the secondary single reflecting member directly onto the photoconductor free of any additional reflecting members.

8. The apparatus of claim 6, wherein the reflecting member comprises a plurality of piezoelectric materials.

9. The apparatus of claim 6, wherein the reflecting member defines a channel.

10. An information handling system, comprising:

a microprocessor; and a printing device coupled to the microprocessor, the printing device comprising:

a photoconductor;

a photonic energy device positioned adjacent the photoconductor; and a single reflecting member located on a support structure adjacent the photonic energy device, wherein the support structure is operable to deform upon application of an electrical voltage such that photonic energy from the photonic energy device may be reflected from the single reflecting member onto the photoconductor free of any additional reflecting members.

11. The system of claim 10, wherein the photoconductor is chosen from the group consisting of a photoconductor drum, a photoconductor belt, a photoconductor plate, and combinations thereof.

12. The system of claim 10, wherein the photonic energy device is chosen from the group consisting of a laser, a light emitting device (LED), and combinations thereof.

13. The system of claim 10, wherein the support structure comprises a piezoelectric material.

14. The system of claim 10, wherein the support structure is operable to deform into a first position upon application of a first electrical voltage in order to reflect photonic energy from the photonic energy device from the single reflecting member directly onto a first location on the photoconductor, and the support structure is operable to deform into a second position upon application of a second electrical voltage in order to reflect photonic energy from the photonic energy device from the single reflecting member directly onto a second location on the photoconductor.

15. The system of claim 14, wherein the reflecting the photonic energy from the single reflecting member directly onto the first location and the second location comprises reflecting the photonic energy from the single reflecting member in at least two dimensions.

16. The system of claim 15, wherein the reflecting member comprises a plurality of piezoelectric materials.

17. The system of claim 15, wherein the reflecting member defines a channel.

18. The system of claim 10, further comprising:

a plurality of secondary photonic energy devices positioned adjacent the photoconductor, each secondary photonic energy device comprising a secondary single reflecting member located on a secondary support structure adjacent the secondary photonic energy device, wherein the secondary support structure is operable to deform upon application of an electrical voltage such that photonic energy from the secondary photonic energy device may be reflected form the secondary single reflecting member directly onto the photoconductor free of any additional reflecting members.

19. A method for producing an image, comprising:

providing a photoconductor, a photonic energy device located adjacent the photoconductor, and a single reflecting member located on a support structure adjacent the photonic energy device;

charging the photoconductor;

deforming at least a portion of the support structure by applying an electrical voltage to the support structure; and discharging portions of the photoconductor by reflecting photonic energy from the photonic energy device from the single reflecting member directly onto the photoconductor free of any additional reflecting members.

20. The method of claim 19, further comprising:

applying toner to the charged area of the photoconductor;

transferring the toner to a printing medium; and producing an image on the printing medium.

* * * * *

UNITED STATES PATENT AND TRADEMARK OFFICE

CERTIFICATE OF CORRECTION

PATENT NO. : 7,479,973 B2
APPLICATION NO. : 11/317347
DATED : January 20, 2009
INVENTOR(S) : James Arthur Brewer et al.

It is certified that error appears in the above-identified patent and that said Letters Patent is hereby corrected as shown below:

Claim 18; Column 14, Line 31, delete “form” and insert --from--.

Signed and Sealed this

Twenty-sixth Day of May, 2009

JOHN DOLL
*Acting Director of the United States Patent and Trademark Office*